(12) United States Patent
Tinnin et al.

(10) Patent No.: US 11,685,421 B1
(45) Date of Patent: Jun. 27, 2023

(54) SPRING BUMPER ASSEMBLY FOR AN ADJUSTABLE STEERING COLUMN

(71) Applicant: Steering Solutions IP Holding Corporation, Saginaw, MI (US)

(72) Inventors: Melvin L. Tinnin, Clio, MI (US); Joen C. Bodtker, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/555,203

(22) Filed: Dec. 17, 2021

(51) Int. Cl.
*B62D 1/19* (2006.01)
*B62D 1/184* (2006.01)

(52) U.S. Cl.
CPC .............. *B62D 1/19* (2013.01); *B62D 1/184* (2013.01)

(58) Field of Classification Search
CPC .................................. B62D 1/19; B62D 1/184
See application file for complete search history.

(56) References Cited

U.S. PATENT DOCUMENTS

| | | | | |
|---|---|---|---|---|
| 2018/0079443 A1* | 3/2018 | Anspaugh | .............. | B62D 1/185 |
| 2018/0105196 A1* | 4/2018 | Bodtker | ................ | B62D 1/192 |
| 2021/0316779 A1* | 10/2021 | Dubay | ................... | B62D 1/184 |
| 2022/0266890 A1* | 8/2022 | Buzzard | ................ | B62D 1/195 |

FOREIGN PATENT DOCUMENTS

| | | | | | |
|---|---|---|---|---|---|
| CN | 105416379 A | * | 3/2016 | ............ | B62D 1/184 |
| CN | 109080693 A | * | 12/2018 | ............ | B62D 1/184 |
| DE | 102013109931 A1 | * | 3/2015 | ............ | B62D 1/184 |
| EP | 3222494 A2 | * | 9/2017 | ............ | B62D 1/184 |
| GB | 2311839 A | * | 10/1997 | ............ | B62D 1/184 |
| KR | 102196925 B1 | * | 12/2020 | | |
| WO | WO-2016068437 A1 | * | 5/2016 | ............... | B62D 1/18 |

* cited by examiner

*Primary Examiner* — Drew J Brown
(74) *Attorney, Agent, or Firm* — Dickinson Wright PLLC

(57) ABSTRACT

A steering column with an energy absorbing assembly. The steering column comprising a first jacket and a second jacket that is axially movable with respect to the first jacket. The second jacket includes a window. The energy absorbing apparatus includes a lock cam located in the window and connected to the second jacket and a strap body that is connected to the first jacket. The lock cam includes a toothed portion for selective engagement with the strap body. The energy absorbing apparatus includes at least one of a cam spring located between the lock cam and an edge of the window or a bumper.

16 Claims, 8 Drawing Sheets

US 11,685,421 B1

SPRING BUMPER ASSEMBLY FOR AN ADJUSTABLE STEERING COLUMN

TECHNICAL FIELD

The following description relates to energy absorbing devices, and more particularly, to a cam spring and a bumper for a lock cam in an adjustable steering column.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Steering columns include various safety features, such as airbags to lessen impact forces. In addition, many steering column assemblies are collapsible and include one or more energy absorption features, such as energy absorbing straps, that allow a certain amount of controlled compression.

Some energy absorbing straps are configured to roll along their length to absorb energy, and are often referred to as roll straps. Typically, roll straps absorb energy during the deformation of the strap in an impact event wherein kinetic energy can be dissipated through compression of the steering column assembly. These energy absorbing straps include a series of teeth that become intermeshed with a strap actuator. The strap actuators typically include a locking cam or other device that is moveable between engagement and disengagement with the series of teeth. The energy absorbing strap is typically located in a long channel extending through a lower jacket and is retained therein with a complicated series of non-integral stiffening brackets and guides. The strap actuator is then connected to one of the stiffening brackets and the locking cam is biased with a small and complicated wire-form cam spring. The long channel in the lower jacket allows for strap travel, which requires added material to compensate for lost rigidity and strength. Space also oftentimes has to be made for a tail of the strap to feed out unimpeded to control the absorption load further creating packaging difficulties.

Accordingly, there is a continuing need to improve the operational framework of energy absorption features to improve upon packaging, load requirements, and tunability.

SUMMARY

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

An aspect of the disclosure includes an energy absorbing assembly. The energy absorbing assembly comprises a lock cam including a toothed portion, a bumper having at least one loop, and a pivot pin connected to the lock cam and extending through the at least one loop.

Another aspect of the disclosure includes an energy absorbing assembly. The energy absorbing assembly comprises a lock cam including a tail portion and a toothed portion, a cam spring operably connected to the lock cam, and a pivot pin connected to the lock cam and the lock cam biased by the cam spring in a pivot direction.

Another aspect of the disclosure includes a steering column with an energy absorbing assembly. The steering column comprising a first jacket and a second jacket that is axially movable with respect to the first jacket. The second jacket includes a window. The energy absorbing apparatus includes a lock cam located in the window and connected to the second jacket and a strap body that is connected to the first jacket. The lock cam includes a toothed portion for selective engagement with the strap body. The energy absorbing apparatus includes at least one of a cam spring located between the lock cam and an edge of the window or a bumper.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Steering columns include various safety features, such as airbags to lessen impact forces. In addition, many steering column assemblies are collapsible and include one or more energy absorption features, such as energy absorbing straps, that allow a certain amount of compression.

Figure 1:
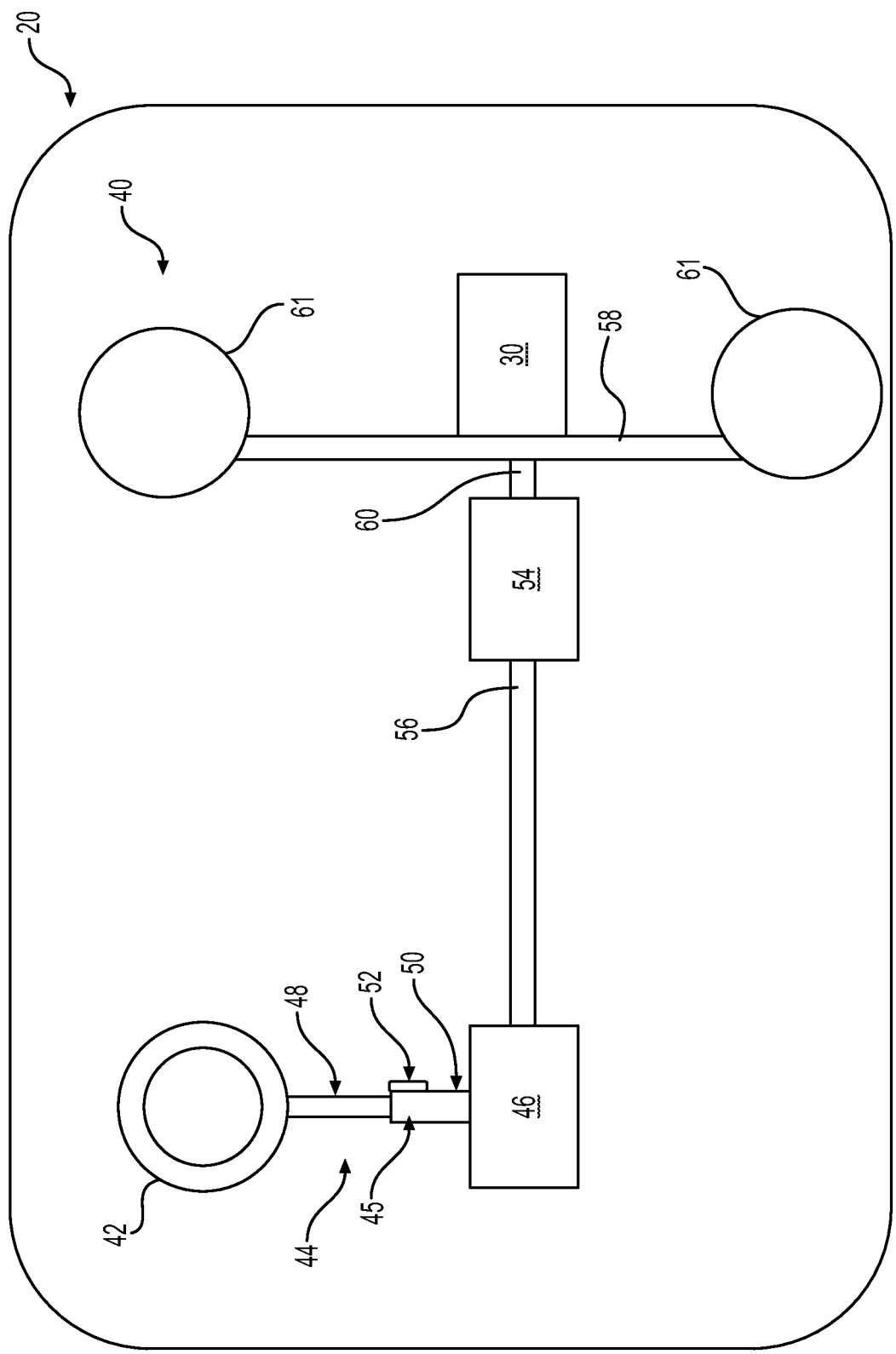
FIG. 1 generally illustrates a vehicle with a steering system according to the principles of the present disclosure.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 may include a steering column 45 that extends along an axis from the input device 42 to an output assembly 46. The output assembly 46 may include a pinion shaft assembly, an I-shaft, a cardan joint, steer-by-wire components or any other features conventionally located opposite the input device 42.

The steering column 45 may include at least two axially adjustable portions, for example, a first jacket 48 and a second jacket 50 that are axially adjustable with respect to one another. The first jacket 48 may be an upper jacket and a second jacket 50 may be a lower jacket, wherein the first jacket 48 and the second jacket 50 are permitted to move axially with respect to one another during an impact or other compressive forces. The axial movement may include sliding, telescopic, translating, and other axial movements. The steering column assembly 44 may include additional portions that permit axial movement and brackets that provide rake and tilt movement. More particularly, the steering column assembly 44 may include a powered actuator (not shown) wherein the axial adjustments are machine driven.

An energy absorbing assembly 52 may be located on one or each of the first jacket 48, the second jacket 50, any brackets, or combinations thereof, and provide at least one of variable stroke load absorption settings and a steering column lock functionality. The energy absorbing assembly may dissipate kinetic energy between the first jacket 48 and the second jacket 50.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 61.

Figure 2:
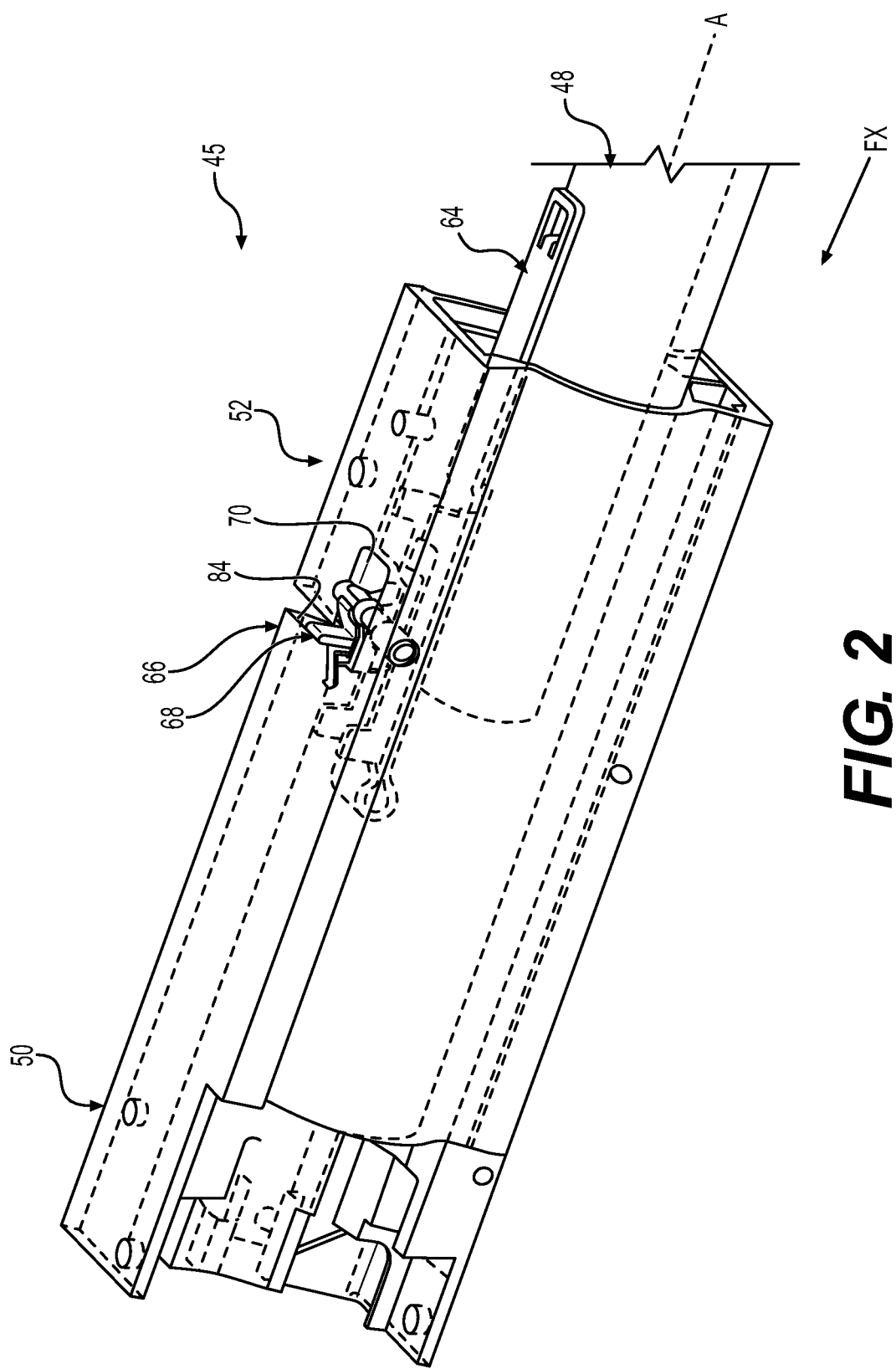
FIG. 2 generally illustrates a steering column with an energy absorbing assembly for dissipating kinetic energy between a first jacket and a second jacket.

FIG. 2 generally illustrates a steering column 45 with the energy absorbing assembly 52 for dissipating kinetic energy between a first jacket 48 and a second jacket 50. The first jacket 48 and the second jacket 50 extend along an axis A. The energy absorbing assembly 52 may be connected to the first jacket 48 (upper jacket), the second jacket 50 (lower jacket), or a combination thereof. In some embodiments, the energy absorption apparatus 52 includes an energy absorbing roll strap body 64 that is at least partially coupled to the first jacket 48 and at least partially extends between the first jacket 48 and the second jacket 50. During a collapse event, a force 'Fx' may move or collapse the first jacket 48 into second jacket 50 along the axis A and the energy absorbing assembly 52 dissipates at least some of the kinetic energy of collapsing first jacket 48 and the second jacket 50.

Figure 3:
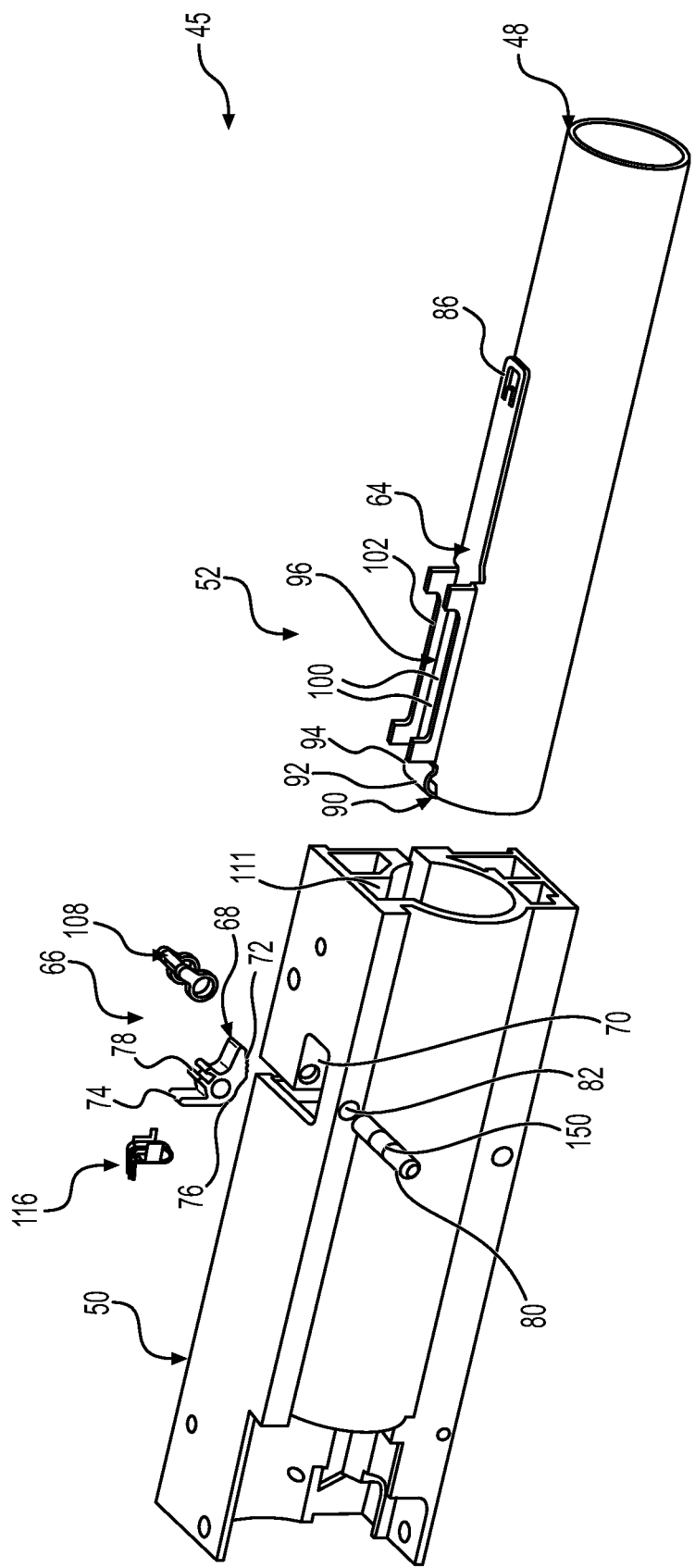
FIG. 3 generally illustrates a disassembled view of the steering column from FIG. 2.

With continued reference to FIG. 2, the energy absorbing assembly 52 may further include an energy absorbing actuator 66. The energy absorbing actuator 66 includes a lock cam 68 that moves between a locked position and an unlocked position. In the locked position, the lock cam 68 is articulated into a locked engagement with the strap body 64. In the unlocked position, the lock cam 68 is articulated such that it is spaced from the strap body 64. In some embodiments, the second jacket 50 includes a window 70 that locates at least part of the lock cam 68. With reference now to FIG. 2 and FIG. 3, the lock cam 68 includes a toothed portion 72, a tail portion 74, and a body 76 that spaces the toothed portion 72 from the tail portion 74. The body 76 defines an opening 78 for accommodating a pivot pin 80. In some embodiments, the second jacket 50 includes an aperture 82 for inserting the pivot pin 80 and pivotally connecting the lock cam 68 to the second jacket 50. The window 70 may further include a clamping slot 84 that is transverse to the axis A to clamp the first jacket 48 and the window 70.

Figure 4:
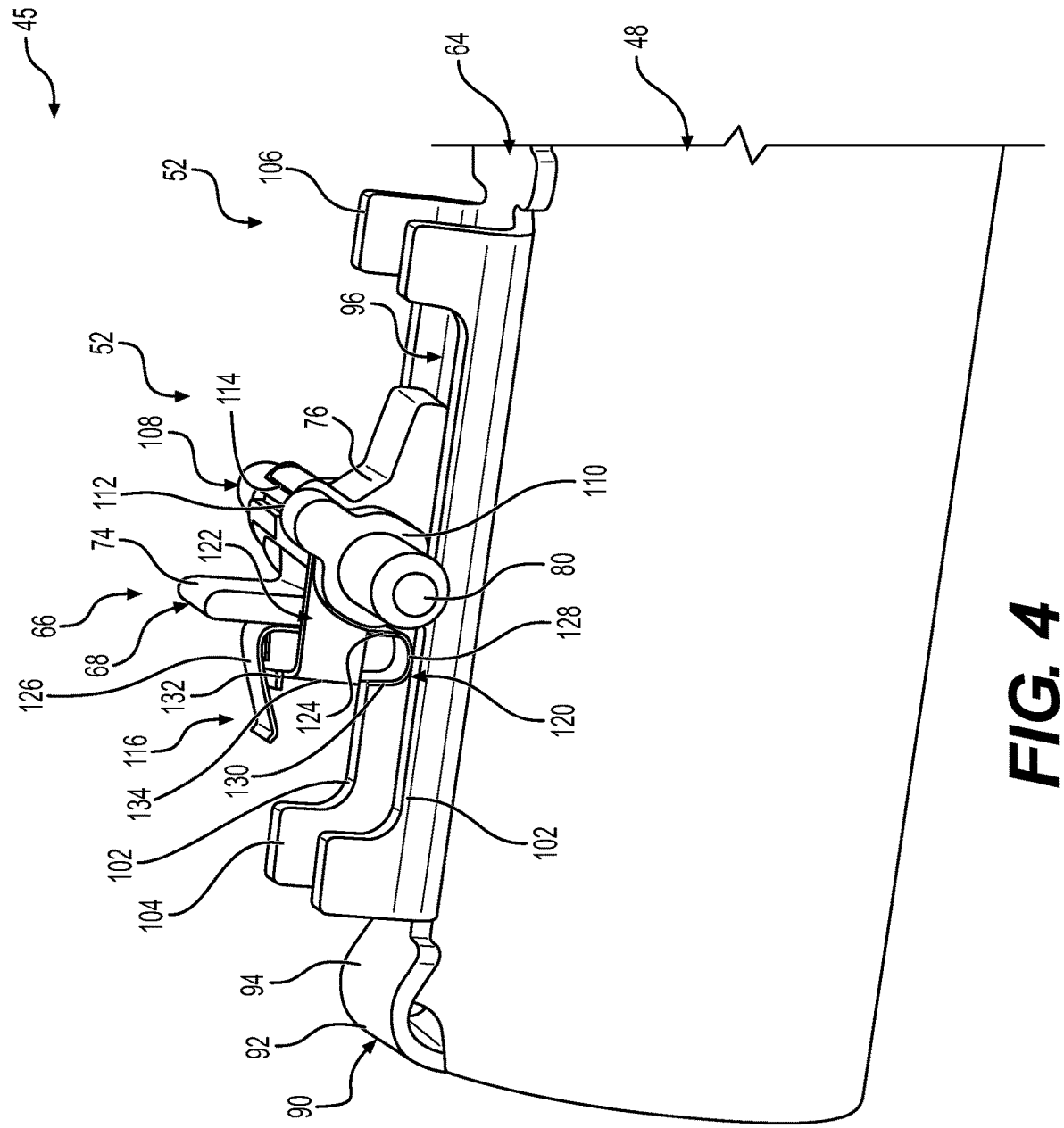
FIG. 4 generally illustrates an enlarged side view of the energy absorption apparatus.
Figure 6:
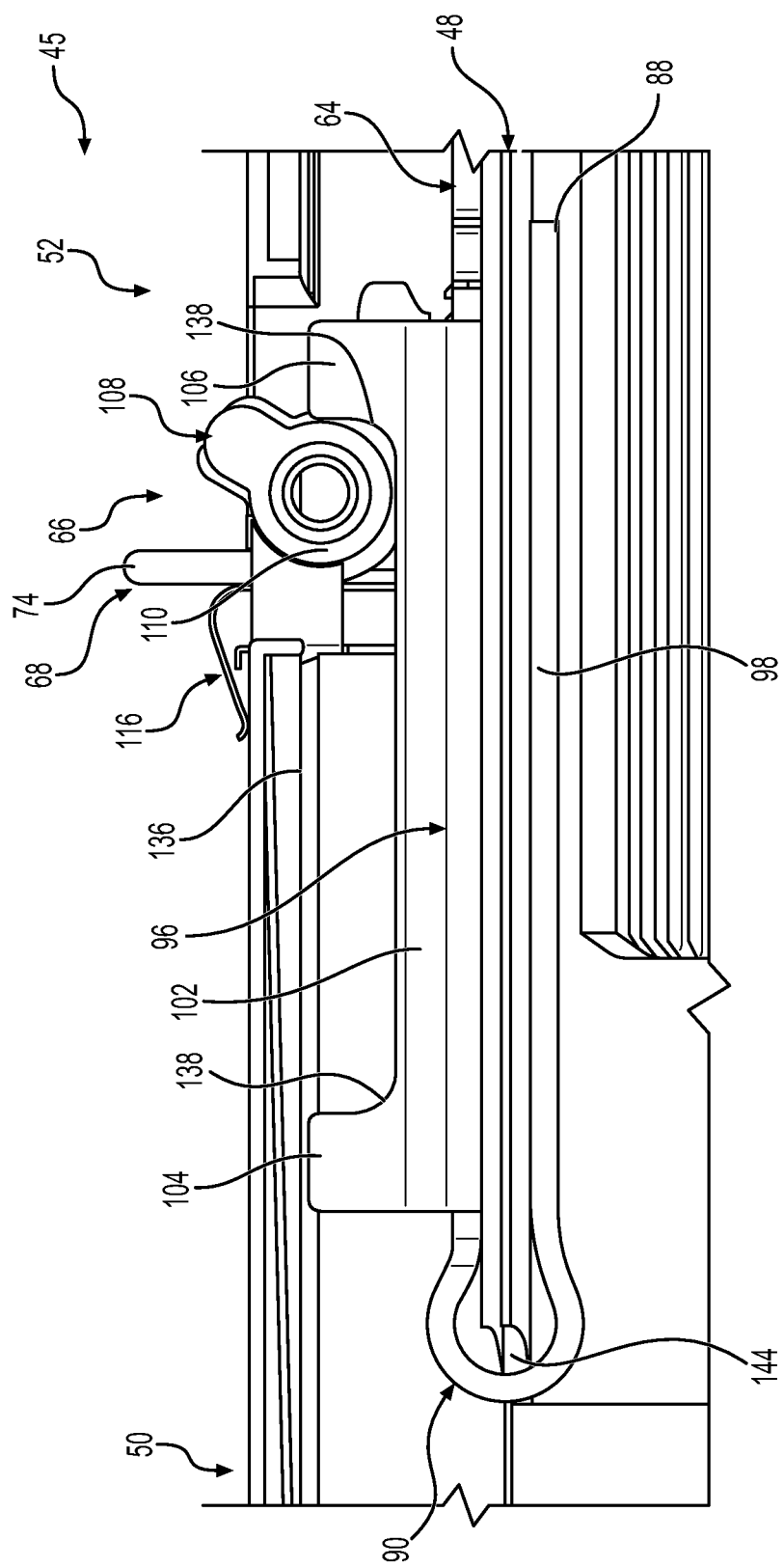
FIG. 6 generally illustrates a side view of the energy absorption apparatus in a hard stop position.

With reference now to FIG. 3 and FIG. 4, the energy absorbing roll strap body 64 may include a first end 86 and a second end 88 (FIG. 6) spaced from the first end 86 by an intermediate portion 90. The first end 86 may be located on an outer surface of the first jacket 48 and the second end may be located on an inner surface of the first jacket 48 (FIG. 6). The intermediate portion 90 includes a curved portion 92. The curved portion 92 may facilitate "rolling" of strap body 64 during a collapse event as first end 86 or second end 88 moves in the direction of force 'Fx'. The intermediate portion 90 may include an initial collapse or roll area 94 is located between the curved portion 92 and a first flat portion 96 that extends from the first end 86 to the intermediate portion 90. The initial roll area 94 represents the starting roll or deformation location where the "roll" or deformation of strap body 64 begins during a collapse event. A second flat portion 98 (FIG. 6) extends between the intermediate portion 90 and the second end 88.

The first flat portion 96 includes a series of teeth 100 extending therefrom. A pair of sidewalls 102 may extend along the first portion 96 on opposite sides of the teeth 100. Each sidewall 102 may extend between a lower stop tab 104 and an upper stop tab 106. In use, the lower stop tab 104 may contact a portion of the energy absorbing actuator 66 and create a hard stop in a first direction and the upper stop tab 106 may contact a portion of the energy absorbing actuator 66 and create a hard stop in a second direction. More particularly, the lock cam 68 includes a bumper 108. The bumper 108 includes a pair of loops 110 spaced from a bridge portion 112. The lock cam 68 includes a bumper slot 114 for retaining the bridge portion 112 and the loops 110 are located on opposite surface of the lock cam 68 and the pivot pin 80 extends through each loop 110. Each of the loops 110 are sized and spaced to contact the lower stop tab 104 and the upper stop tab 106 in the hard stop positions. The second jacket 50 may further define a channel 111 sized to guide the lower stop tab 104 and the upper stop tab 106 in a direction along the axis A.

With reference to FIG. 4, the energy absorbing actuator 66 includes a cam spring 116. The cam spring 116 includes a spring portion 120 and a housing 122. The spring portion 120 may be configured as a flat spring and include a first leg 124 that abuts a rear surface of the lock cam 68 and extends between a first clip 126 to a bend 128. The spring portion 120 further includes a second leg 130 that extends from a second clip 132 to the bend 128. The second leg 130 abuts an inner surface of the window 70 and includes spring retaining tabs 134 extending to a groove 136 of the second jacket 50. The first leg 124 and the second leg 130 are spaced apart by the bend 128. The second clip 132 extends at a transverse angle from the second leg 130 over an exterior surface of the second jacket 50. The first clip 126 extends at a transverse angle from the first leg 124 over the exterior of the second jacket 50 and the second clip 132.

Figure 5:
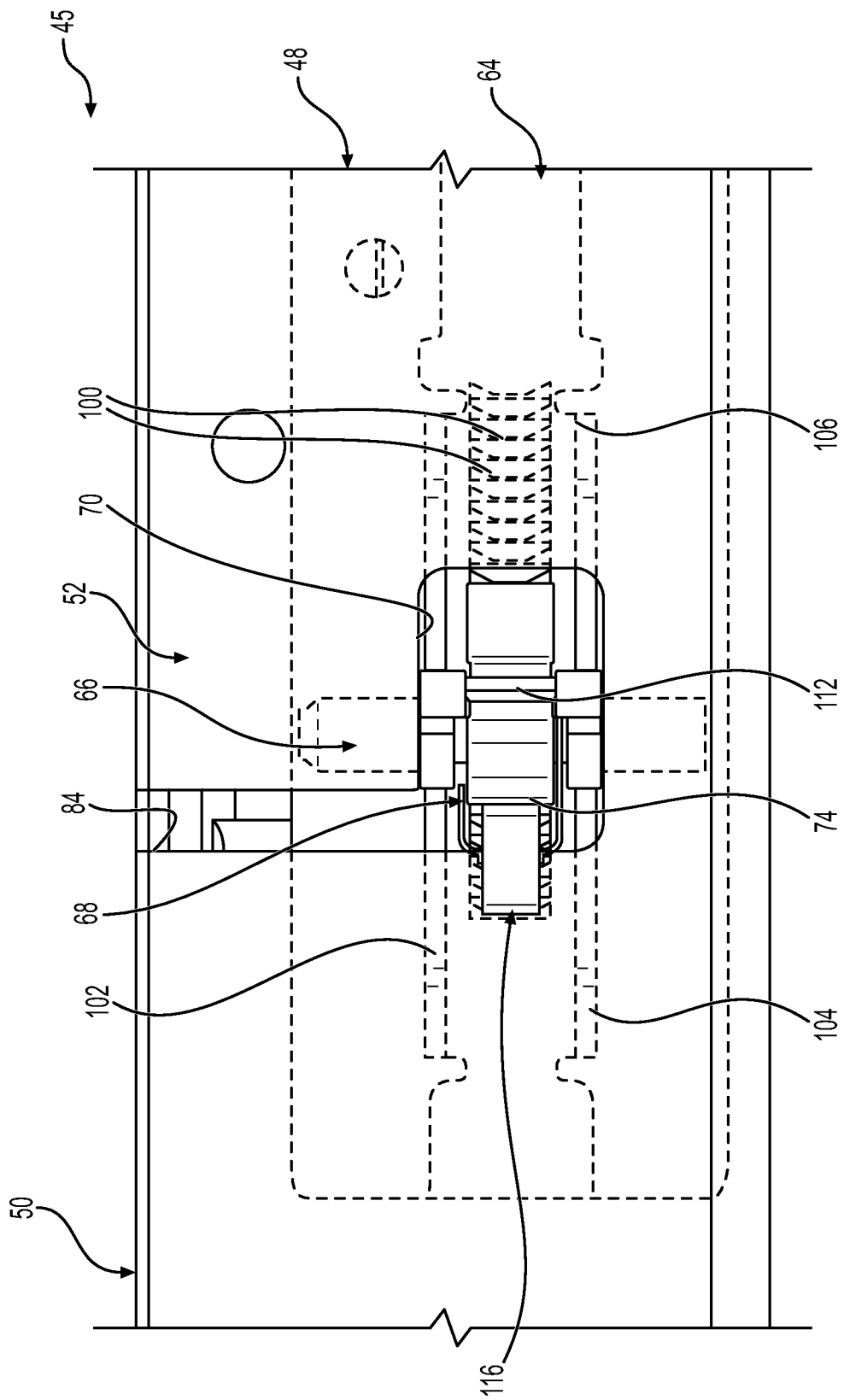
FIG. 5 generally illustrates an enlarged top view of the energy absorption apparatus located in the steering column.

FIG. 5 generally illustrates an enlarged top view of the energy absorption apparatus 52 located in the steering column 45. As illustrated, the toothed portion 72 is sized to fit between the sidewalls 102 and selectively engage the series of teeth 100 on the first flat portion 96. The loops 110 of the bumper 108 extend from the lock cam 68 into a relative path of travel of the lower stop tab 104 and the upper stop tab 106. The bumper 108 may be formed on an elastic material such that contact therewith is quieted. FIG. 6 generally illustrates a side view of the energy absorption apparatus 52 in one of the hard stop positions wherein the loop 110 is engaged with the upper stop tab 106. As illustrated, the lower stop tab 104 and the upper stop tab 106 each include a bumper interface surface 138 that is rounded to interface with the circular loops 110. At a terminal end of the first jacket 48, there may be a notch 144 sized to accommodate a width of the curved portion 92.

Figure 7A:
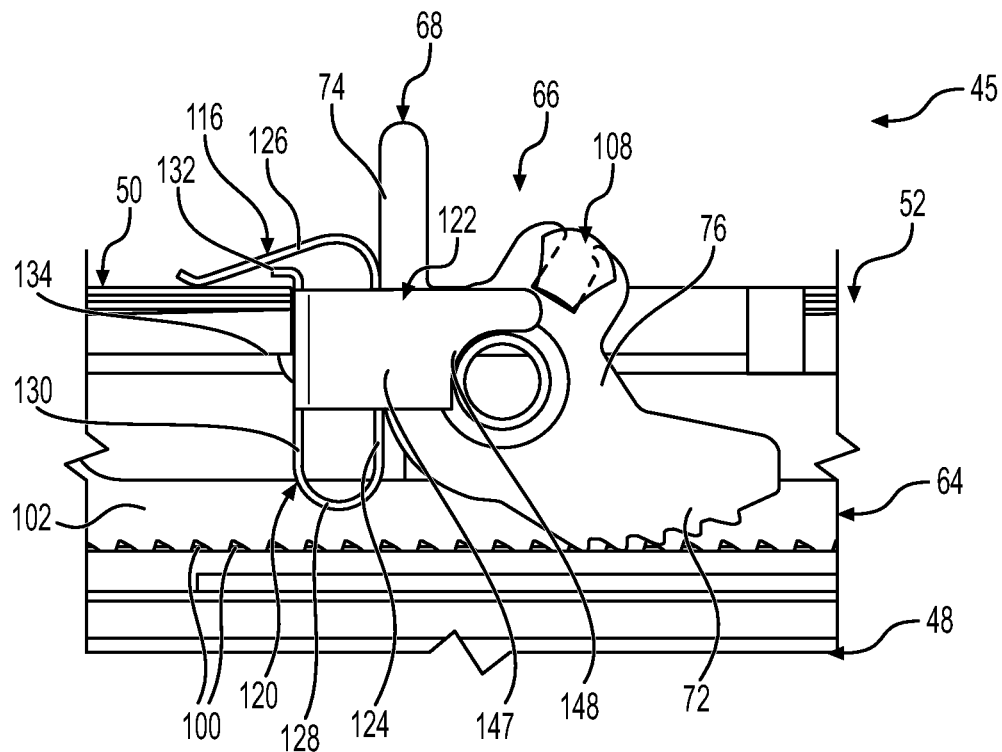
FIG. 7A generally illustrates a lock cam of the energy absorption apparatus in a locked position.
Figure 7B:
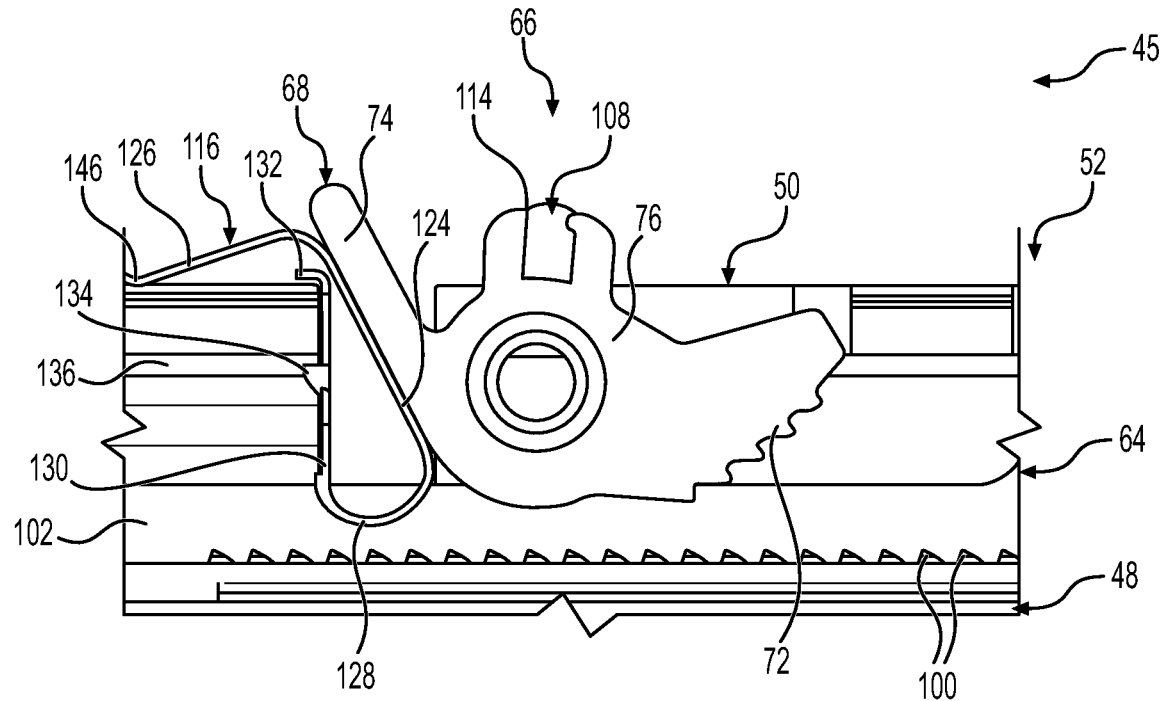
FIG. 7B generally illustrates the lock cam of the energy absorption apparatus in an unlocked position.

FIG. 7A generally illustrates the lock cam 68 in the locked position. As illustrated, the tail portion 74 may be biased in a pivot direction towards the locked position by the cam spring 116. The first clip 126 may extend to a clip bend 146 such that an edge on a terminal end of the first clip 126 does not wear on and scratch the exterior surface of the second jacket 50. The housing portion 120 may be generally U-shaped and include a pair of wings 147 that extend around opposite sides of the first leg 124 and opposite sides of the second leg 130 to center the cam spring 116 on an end of the lock cam 68 facing a direction of the axis A. Each of the wings 147 may extend to a pin interface surface 148. Each of the pin interface surface 148 may be inserted into annular grooves 150 (FIG. 3) of the pivot pin 80 on opposite sides of the lock cam 68. Each interface surface 148 may be rounded to match a profile of the annular grooves 150. Each interface surface 148 may extend from a center axis of the pivot pin 80 upwardly and at least partially around an upper surface thereof. The cam spring 116 may therefore bias the pivot pin 90 and lock cam 68 in a first pivot direction (e.g. towards a locked position). FIG. 7B generally illustrates the lock cam 68 in the unlocked position wherein the cam spring 116 (illustrated without the housing portion 120) is compressed by moving the first leg 124 towards the second leg 126 (e.g. by actuating the tailed portion 74). More particularly, the first leg 124 is articulated with respect to the bend 128 and an upper portion of the first leg 124 is moved towards the second leg 130. During this movement of the lock cam 68 in a pivot direction, the first clip 126 moves from a first angle to a second angle, wherein the second angle is closer to being parallel to the axis A than the first angle. In the unlocked position, the first jacket 48 may be moved along the axis A with respect to the second jacket 50.

Figure 8A:
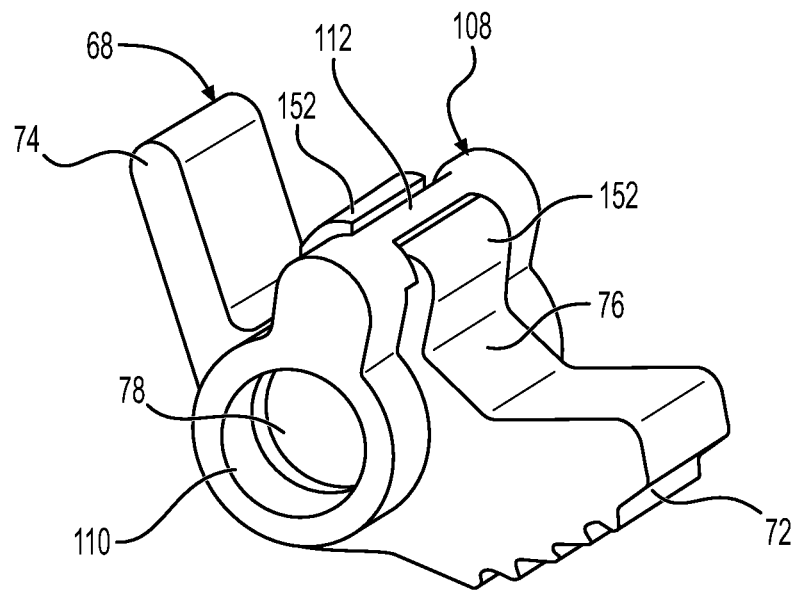
FIG. 8A generally illustrates the lock cam of the energy absorption apparatus with a bumper connected thereto.
Figure 8B:
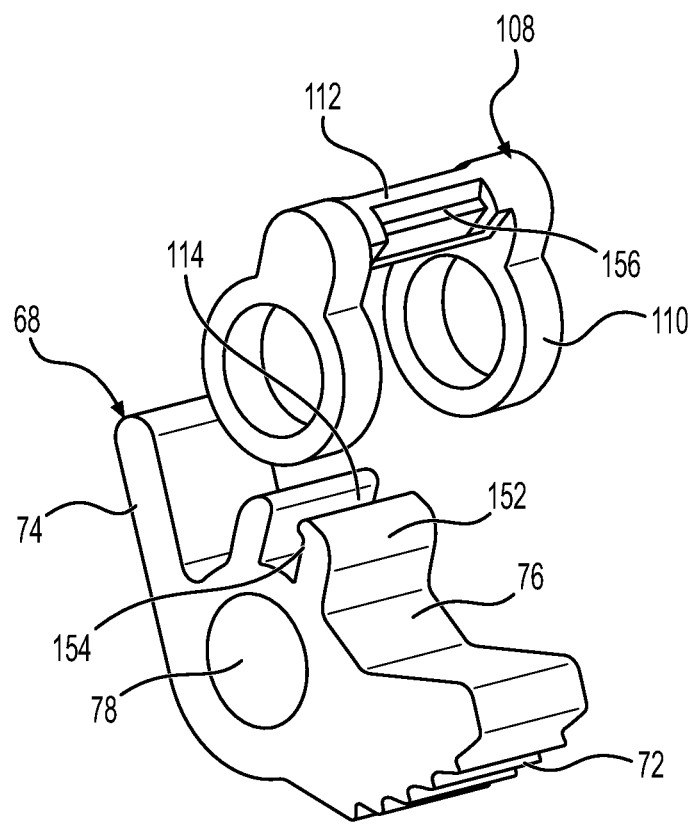
FIG. 8B generally illustrates the lock cam of the energy absorption apparatus with a bumper disconnected therefrom.

FIG. 8A generally illustrates the lock cam 68 isolated from the other features of the energy absorption apparatus 52 with the bumper 108 connected thereto. FIG. 8B generally illustrates the lock cam 68 isolated from the other features of the energy absorption apparatus 52 with the bumper 108 disconnected therefrom. As best illustrated in FIG. 8B, the bumper slot 114 may be defined by a pair of prongs 152 and at least one of the prongs 152 may include a hook 154 extending into the bumper slot 114. The bridge portion 112 may include at least one rib 156 for latching onto the at least one hook 154 to form a snap-fit engagement therewith. The bridge portion 112 may include a first profile 158 that matches the bumper slot 114 and a second profile 160 that extends outwardly beyond the prongs 152.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. An energy absorbing assembly for a steering column comprising:
    a lock cam including a toothed portion;
    a bumper having at least one loop; and
    a pivot pin connected to the lock cam and extending through the at least one loop, wherein the lock cam includes a bumper slot and the bumper includes a bridge portion extending into the bumper slot.

2. The energy absorbing assembly of claim 1, wherein the at least one loop includes a pair of loops on opposite sides of the lock cam.

3. The energy absorbing assembly of claim 1, wherein the bumper slot is defined by at least one prong having a hook portion.

4. The energy absorbing assembly of claim 1, wherein bridge portion includes at least one rib in locked engagement with the hook.

5. An energy absorbing assembly for a steering column comprising:
a lock cam including a tail portion and a toothed portion;
a cam spring operably connected to the tail portion; and
a pivot pin connected to the lock cam and the lock cam biased by the cam spring in a pivot direction, wherein the cam spring includes a first leg extending along the tail portion and a second leg spaced from the first leg by a bend, wherein the first leg extends from a first clip at a transverse angle therefrom for contacting a provided jacket of a steering column.

6. The energy absorbing assembly of claim 5, wherein the second leg extends from a second clip at a transverse angle therefrom for contacting the provided jacket.

7. The energy absorbing assembly of claim 6, wherein the cam spring includes a retaining tab for connecting to the provided jacket.

8. The energy absorbing assembly of claim 5, wherein the first clip includes a clip bend for spacing an edge on a terminal end of the first clip from the provided jacket.

9. An energy absorbing assembly for a steering column comprising:
a lock cam including a tail portion and a toothed portion;
a cam spring operably connected to the tail portion; and
a pivot pin connected to the lock cam and the lock cam biased by the cam spring in a pivot direction, wherein the cam spring includes a housing extending to at least one pin interface surface.

10. The energy absorbing assembly of claim 9, wherein the pivot pin includes at least one groove and the at least one pin interface surface extends into the at least one groove.

11. The energy absorbing assembly of claim 9, wherein the at least one pin interface surface includes a pair of interface surfaces and the at least one groove includes a pair of grooves.

12. A steering column comprising:
a first jacket and a second jacket that is axially movable with respect to the first jacket;
the second jacket including a window;
an energy absorbing apparatus including a lock cam located in the window and connected to the second jacket and a strap body that is connected to the first jacket;
the lock cam including a toothed portion for selective engagement with the strap body; and
at least one of a cam spring located between the lock cam and an edge of the window or a bumper, wherein the strap body includes a lower stop tab and an upper stop tab and wherein the energy absorbing apparatus includes the bumper that contacts the lower stop tab and the upper stop tab.

13. The steering column of claim 12, wherein the bumper includes a pair of loops on opposite surfaces of the lock cam and a pivot pin is connected to the lock cam and extends through the pair of loops.

14. The steering column of claim 13, wherein the bumper includes a bridge portion spacing the loops and the lock cam includes a bumper slot that the bridge portion is located in.

15. The energy absorbing assembly of claim 12, wherein the energy absorbing apparatus includes the cam spring and the cam spring includes a first leg extending along the lock cam and a second leg spaced from the first leg by a bend and extending along an edge of the window.

16. The energy absorbing assembly of claim 15, wherein the cam spring includes a pair of spring retaining tabs and the second jacket includes a groove connected to the retaining tabs.

* * * * *